United States Patent [19]
Becker

[11] Patent Number: 6,124,048
[45] Date of Patent: Sep. 26, 2000

[54] MAGNETO-OPTICAL STORAGE MEDIUM WITH DOUBLE MASK

[75] Inventor: Stephan Becker, Wiesbaden, Germany

[73] Assignee: U.S. Philips Corporation, New York, N.Y.

[21] Appl. No.: 09/339,553

[22] Filed: Jun. 24, 1999

[30] Foreign Application Priority Data

Jun. 27, 1998 [DE] Germany ............................... 19828757
Jul. 10, 1998 [DE] Germany ............................... 19830936

[51] Int. Cl.⁷ ....................................................... G11B 5/66
[52] U.S. Cl. ............................... 428/694 MM; 427/131; 427/132; 428/694 EC; 428/900; 428/928
[58] Field of Search ................... 428/694 MM, 428/694 EC, 900, 928; 427/131, 132

Primary Examiner—Bernard Pianalto
Attorney, Agent, or Firm—Leroy Eason

[57] ABSTRACT

A magneto-optical storage medium for the repeated writing of information at a write temperature $T_w$, or at two write temperatures $T_h$, $T_i$, above the room temperature $T_a$ and for the repeated reading out at a temperature $T_m$, with a front mask at the temperature $T_f$ and a rear mask at a temperature $T_r$, above the room temperature $T_a$, in an external magnetic field $H_e$, which medium includes a substrate, a first magnetic layer which is disposed on the substrate and has a temperature-dependent coercivity $H_{C1}(T)$, a compensation temperature $T_{cp1}$ and a Curie temperature $T_{C1}$, a second magnetic layer which is disposed on the first magnetic layer and has a temperature-dependent coercivity $H_{C2}(T)$, a compensation temperature $T_{cp2}$ and a Curie temperature $T_{C2}$, and a third magnetic layer which is disposed on the second magnetic layer and has a temperature-dependent coercivity $H_{C3}(T)$, a compensation temperature $T_{cp3}$ and a Curie temperature $T_{C3}$, where:

$T_a < T_f < T_m \leq T_{cp1} \leq T_{cp2} < T_{C2} < T_r < T_{C1} < T_{cp3} < T_{C3} \leq T_w$ and $H_{C1}(T) < H_e$ for $T_a < T < T_m$
$H_{C2}(T) < H_e$ for $T_a < T < T_m$
$H_{C3}(T) > H_e$ for $T < T_w$, is characterized by a high signal to noise ratio which is achieved as a result of an improved magneto-optical effect.

2 Claims, 4 Drawing Sheets

MAGNETO-OPTICAL STORAGE MEDIUM WITH DOUBLE MASK

The invention relates to a magnetic-optical storage medium for the repeated writing and reading out of high-density information, which medium includes a substrate, a first magnetic layer for reading out information, a second magnetic intermediate layer, and a third magnetic layer for storing information, the Curie temperature of the second layer being lower than the Curie temperature of the first and the third layer.

Magneto-optical storage media enable economical storage and transport of large quantities of data. They combine the high bit density and data integrity of optical data recording with the permanence and ease of erasability of magnetic storage. As in conventional magnetic storage media, the information is stored as a sequence of differently magnetized regions, i.e. as magnetic domain patterns. Magneto-optical storage media are characterized by their extremely reliable, fast and substantially unlimited rewritability.

Information can be written on a magneto-optical storage medium by combining the effect of a magnetic field with the heating effect of a laser. The laser light heats a local region of the storage medium while the magnetic field orients this region. The direction of the magnetization is then dependent on the direction of the applied magnetic field. Reading out is performed by means of the same laser which, however, is then operated with a lower intensity. The polarization direction of the reflected or transmitted light is dependent on the magnetization of the relevant location. This polarization variation can be measured and thus yields the stored information again. Physically speaking, this interaction between magnetic materials and polarized laser light is referred to as the Kerr effect (reflection) or Faraday effect (transmission).

Magneto-optical storage media should have a high data density, a high write sensitivity and a high read-out accuracy. The maximum data density that can be achieved for magneto-optical media is limited on the one hand by the minimum size of the magnetic domains and on the other hand by the optical resolution of the laser optical system. Because the minimum size of the magnetic domains is significantly smaller than the optical resolution of conventional laser optical systems, being proportional to the wavelength of the laser used, the storage density ultimately is limited by the resolution of the laser optical system.

As opposed to optical phase change storage media, for magneto-optical storage media Magnetic Super Resolution can be achieved by using exchange coupled layer systems while utilizing the temperature gradient produced on the medium by the laser beam. Such an MSR method enables the reading-out of data with a data density which is higher than that corresponding to the resolution of the laser optical system, because all bits, except the current bit being processed, are situated underneath a magnetic mask. As a result, data can be read with a data density which is higher than the density corresponding to the resolution of the laser optical system. Nevertheless, it is attempted to increase the data density even further and to reduce the hardware required for the drives.

For example, EP 0 686 970 discloses a magneto-optical storage medium which includes a substrate, a first magnetic layer which is laminated on the substrate in order to reproduce information, a second magnetic layer which is laminated on the first magnetic layer in order to store the information, and a third magnetic layer which is disposed between the first and the second magnetic layer and has a Curie temperature which is lower than the Curie temperature of the first and the second magnetic layer, a direction of the magnetization of a region in the first magnetic layer, neighboring a region in the third magnetic layer, being oriented in the direction of the magnetization in the vicinity of the region in the first magnetic layer at a temperature which is equal to or higher than the Curie temperature of the third layer.

It is an object of the present invention to provide a magneto-optical storage medium which enables a high signal resolution with a high data density.

According to the invention, this object is achieved by means of a magneto-optical storage medium for the repeated writing of information at a write temperature $T_w$, or at two write temperatures $T_h, T_l$ above room temperature $T_a$ and for the repeated reading out at a temperature $T_m$, with a front mask at the temperature $T_f$ and a rear mask at a temperature $T_r$, above the room temperature $T_a$, in an external magnetic field $H_e$, which medium includes a substrate, a first magnetic layer which is disposed on the substrate and has a temperature-dependent coercivity $H_{C1}(T)$, a compensation temperature $T_{cp1}$ and a Curie temperature $T_{C1}$, a second magnetic layer which is disposed on the first magnetic layer and has a temperature-dependent coercivity $H_{C2}(T)$, a compensation temperature $T_{cp2}$ and a Curie temperature $T_{C2}$, and a third magnetic layer which is disposed on the second magnetic layer and has a temperature-dependent coercivity $H_{C3}(T)$, a compensation temperature $T_{cp3}$ and a Curie temperature $T_{c3}$, where:

$$T_a < T_f < T_m \leq T_{cp1} \leq T_{cp2} < T_{C2} < T_r < T_{C1} < T_{cp3} < T_{C3} < T_w$$

and $$H_{C1}(T) < H_e \text{ for } T_a < T < T_m$$

$$H_{C2}(T) < H_e \text{ for } T_a < T < T_m$$

$$H_{C3}(T) > H_e \text{ for } T < T_w$$

Because of the enhanced magneto-optical effect, the magneto-optical storage medium according to the invention features a high signal-to-noise ratio. The magnetic properties of the read-out layer change drastically in the read-out spot and produce acute and suitably defined transitions between the various magnetic configurations during the reading-out by means of magnetic super resolution.

A preferred embodiment of the magneto-optical storage medium according to the invention is characterized in that it includes a fourth magnetic layer which is disposed on the third magnetic layer and has a temperature-dependent coercivity $H_{C4}(T)$, a compensation temperature $T_{cp4}$ a Curie temperature $T_{C4}$ and the write temperatures $T_l$ and $T_h$, where $$T_a < T_f < T_m \leq T_{cp1} \leq T_{cp2} < T_{C2} < T_r < T_{C1} < T_{cp3} \leq T_{cp4} < T_{C3} < T_l < T_{C4} \leq T_h$$

and $$H_{C4}(T) < H_e \text{ for } T_a < T < T_m \text{ and for } T \leq T_h$$

Such an embodiment of a magneto-optical storage medium according to the invention is suitable for writing by means of a LIMDOW (Laser Intensity Modulation Direct Overwrite) method where the intensity of the laser beam determines the ultimate magnetization direction. New data is then written directly over the old data in one pass, without it being necessary to erase the old data first during a separate write cycle. The write cycle is thus reduced. The magneto-optical drive may have a simple construction for both embodiments, because only one external magnetic field is required for the write and read-out cycle.

The invention will be described in detail hereinafter on the basis of four drawings and two embodiments.

Figure 1:
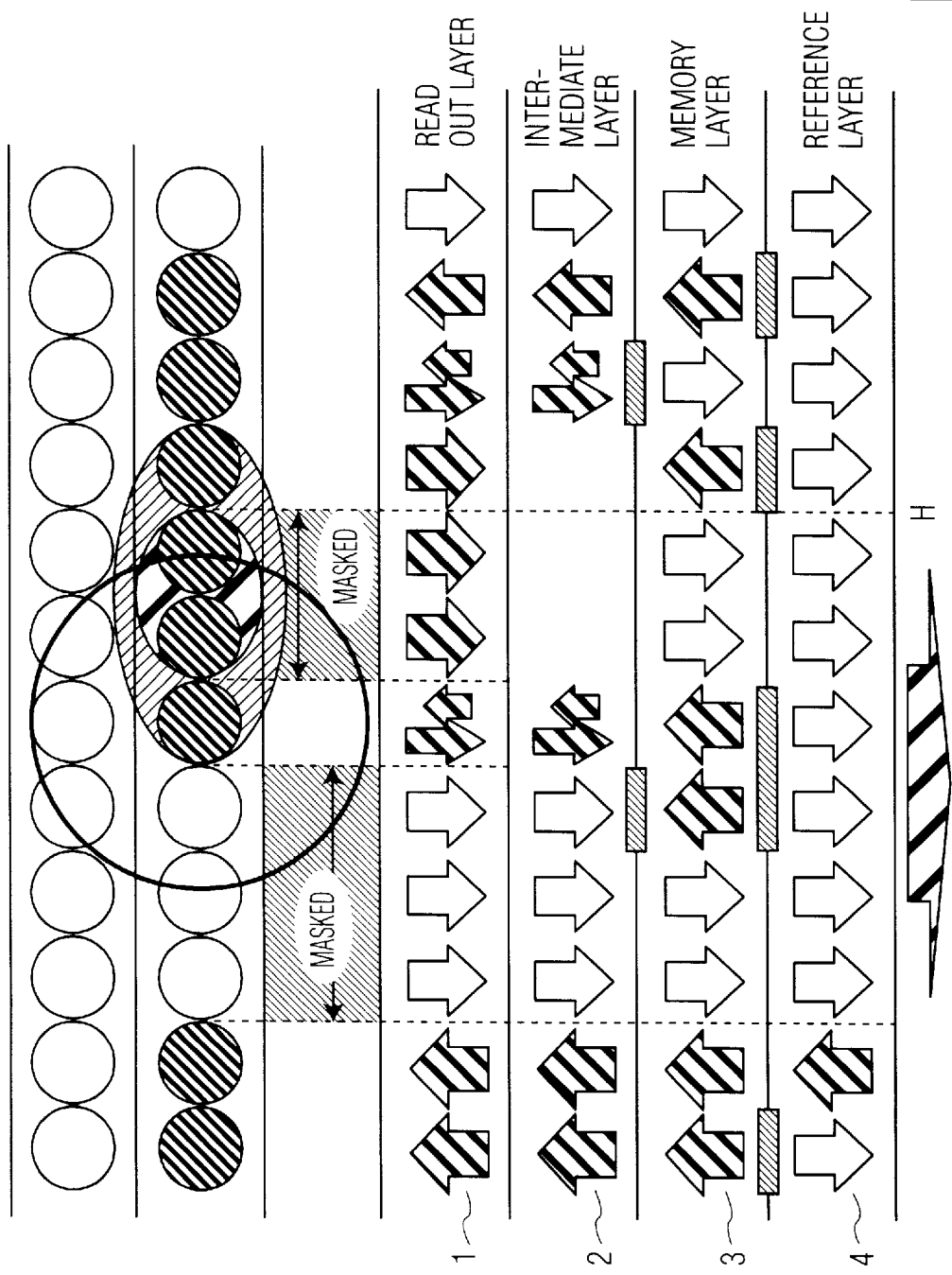
FIG. 1 shows the configuration of a magneto-optical storage medium according to the embodiment 2 during the reading-out of a "log. 1" signal.

A first embodiment of the magneto-optical storage medium according to the invention includes a substrate and three magnetic layers which are arranged one over the other. It may also include one or more further, non-magnetic layers which serve for corrosion protection, for the reflection of the coupled light or for heat dissipation.

The first magnetic layer will be referred to hereinafter as the read-out layer 1, the second magnetic layer as the intermediate layer 2, and the third magnetic layer as the memory layer 3.

The read-out layer is disposed on the transparent substrate so that it faces the laser read-out head. At the instant of reading out, i.e. in the central region of the read-out spot with the temperature $T_m$ and in the range of influence of the drive magnet with the magnetic field $H_e$, it carries the information to be read out from the memory layer in a small sub-region of the region covered by the laser beam. Outside this small sub-region, but still within the region of influence of the drive magnet, the read-out layer is uniformly magnetized in the direction of the external magnetic field and produces a permanent, temporally constant signal therein. Therefore, it does not carry signal information. Outside the region of influence of the drive magnet it contains the same signal information as the memory layer.

At the instant of reading out, i.e. in the central region of the read-out spot and in the region of influence of the drive magnet, the intermediate layer transfers the signal information from the memory layer to the read-out layer. The magnetic coupling between the memory layer and the read-out layer is interrupted in the front and the back region of the read-out spot.

The memory layer is the layer which stores the signal information. During the read-out operation, it saves the stored information whereas the other layers change their magnetization behavior in dependence on the temperature and the external field.

A further, second embodiment of the magneto-optical storage medium according to the invention includes a substrate and four magnetic layers which are arranged one over the other. In addition to the read-out layer, the intermediate layer and the memory layer, this embodiment of the storage medium additionally includes a reference layer 4.

The reference layer has a function during the writing by way of the LIMDOW method. It has a very high compensation point as well as a very high Curie point. During the writing by means of the LIMDOW method, the desired magnetization is imposed on the reference layer at high temperatures, at which the other three layers are neutralized; it passes on this magnetization at lower temperatures, independently of the external field.

The magnetic layers consist of magneto-optical materials which have a uniaxial anisotropy $K_u$ with a magnetic preferred direction extending perpendicularly to the layer surface as well as a temperature-dependent coercivity $H_C$ and a saturation magnetization $M_s$, and can be sub-divided into magnetic domains. The layers are magnetically exchange coupled to one another.

Preferred magneto-optical materials are amorphous alloys of rare earth metals (RE:Gd, Tb, Dy) and transition metals (TM:Fe, Co), for example GdCo, GdFe, TbFe, GdTbFe or GdTbFeCo. For additional adjustment of the Curie temperature, additionally Si can be added to the RE/TM alloy. These RE/TM alloys are ferrimagnetic. Their magnetic behavior can be described as the vectorial addition of the magnetic moments of the RE and TM components which are coupled anti-parallel to one another. The net magnetization of the alloy is yielded by the sum of RE and TM components.

The decrease of the magnetic moments of the RE and the TM component as a function of the temperature is different, which is why the sign of the net magnetization may change due to a temperature variation. At lower temperatures, the magnetization of the RE component is dominant and that of the TM component at higher temperatures. There is a characteristic temperature, being the so-called compensation temperature $T_{cp}$, at which the net magnetization amounts to zero because at this temperature it holds that $M_{RE}=-M_{TM}$. Above the compensation temperature the sign of the net magnetization changes until at the Curie temperature $T_C$ the orientation of the magnetic moments of both components disappears, due to the thermal motion, and the net magnetization decreases to zero again. At the compensation temperature the coercivity $H_C$ goes towards approximately infinite, because an applied external field cannot interact with any externally effective magnetization. On the other hand, just below the Curie temperature a weak magnetic field already suffices to reverse the magnetization. Therefore, ferrimagnetic RE/TM alloys have a high coercivity in the vicinity of the compensation temperature, and a low coercivity near the Curie temperature. A magneto-optical signal is also generated at the compensation point, because the Kerr effect or the Faraday effect is not produced by the net magnetization of the material, but exclusively the TM component at the typical laser wave-lengths, used.

However, in the layers according to the invention, a coupling exists not only between the RE and TM components in a layer, but also between two layers between the RE components on the one side and the TM components on the other side. This coupling between the layers is referred to as the magnetic exchange coupling.

When both layers are magnetically dominated by the same component at a given temperature, the moments of both components as well as both netto magnetizations Ms will be directed in parallel in the energetically most favorable basic state. These layers are referred to as being "coupled in parallel". If one layer is magnetically dominated by the RE component at a given temperature whereas the other layer is dominated by the TM component, in the basic state the magnetic moments of both components will be directed in parallel but the net magnetizations Ms of the two layers will be anti-parallel to one another, so that these layers are referred to as being "coupled anti-parallel". When a parallel net magnetization of the two layers is imposed in the case of anti-parallel coupled layers, the magnetic moments of the two components will be directed opposite one another. As a result, despite the parallel net magnetization a horizontal interface wall (horizontal Bloch wall) is created between the layers, the RE and TM moments being rotated 180° in said interface wall. This interface wall contains an additional energy contribution which is referred to as coupling energy or interface wall energy $\sigma_w$, where $H_w=\sigma_w/2M_s t$, in which $H_w$, M and t are the field strength corresponding to the wall energy, the saturation magnetization and the layer thickness, respectively.

In the vicinity of the compensation point of a RE/TM layer, such a layer practically cannot be influenced by an external magnetic field. However, if a horizontal interface wall exists between this RE/TM layer and a second RE/TM layer, the magnetization of one of the layers can be reversed also in the vicinity of its compensation point and also against an external field if the amount of energy released by the annihilation of the interface wall during magnetization reversal is sufficiently large.

The magnetic layers of the magneto-optical storage medium according to the invention can be deposited on the substrate by RF sputtering from RE/TM targets. The compensation temperature and the Curie temperature of the layer are adjusted by variation of the relative quantities of RE and TM components in the layer. The coupling energies can be influenced by the layer composition, by the partial pressure of the protective gas, by application of a magnetic field during the sputter process, as well as by variation of the parameters of the plasma process.

The layers can also be formed by fast cooling from a melt or by simultaneous evaporation of the elementary constituents.

The substrate may consist of a light-transparent dielectric material, such as glass, acrylic glass or synthetic materials such as polycarbonate or other polymer materials. In order to enhance the optical properties and to prevent corrosion, the magneto-optical storage medium may include additional layers of a dielectric material, for example of $Si_3N_4$, AlN, $SiO_2$, $SiO_x$, ZnS or $MgF_2$. The storage medium may also include a reflective layer for reflecting the laser light and for dissipating the heat.

Embodiment 1.

A first embodiment of a magneto-optical storage medium includes a transparent substrate which faces the laser and on which there are provided three magnetic layers, i.e. a read-out layer 1, an intermediate layer 2 and a memory layer 3.

For the compensation and Curie temperatures of the three magnetic layers it holds that:

$$T_a<T_f<T_m\leq T_{cp1}\leq T_{cp2}<T_{C2}<T_r<T_{C1}<T_{cp3}<T_{C3}\leq T_w$$

and $$H_{C1}(T)<H_e \text{ for } T_a<T<T_m$$

$$H_{C2}(T)<H_e \text{ for } T_a<T<T_m$$

$$H_{C3}(T)>H_e \text{ for } T<T_w$$

Writing on this magneto-optical storage medium can be performed by way of a write method customarily used for magneto-optical storage media. For example, the method may be such that a laser heats a region, i.e. a domain, of the storage medium to $T_w$. Because the coercivity of all layers decreases in the vicinity of their Curie temperature, the magnetization of the heated region can be reversed by means of a small magnetic field. During a first write pass the information present is erased by uniform magnetization in a direction perpendicular to the plane of the layer, parallel to the magnetic field. During a second write pass, the direction of the magnetic field is reversed. Local regions of the storage medium are then heated by way of a laser pulse and their magnetization is changed to in a direction which is antiparallel to the first magnetization direction. The storage medium then contains the information in binary form.

The information stored on the magneto-optical storage medium according to the invention is read-out by means of an MSR read-out method where, using moderate heating by means of the laser during reading out, a front and a rear mask with a window at the center of the read-out spot are realized in an intermediate temperature range. At the area of the front and the rear mask the read-out layer is always uniformly oriented parallel to the external field. The read-out mechanism utilizes the same magnetic field $H_e$ as that used for the write mechanism. The MSR read-out method utilizes the temperature distribution which is produced on or in the storage medium by the laser beam and results from the relative motion of the read-out head with respect to the storage medium and from the thermal conductivity of the medium. Co-operation of the two mechanisms yields an ellipsoidal temperature distribution for the read-out spot, which distribution has a non-centralized temperature maximum, relative to the read-out spot, at the rear side of the read-out spot, viewed in the transport direction. The read-out spot has a low temperature $T_f$ at its front, an intermediate temperature $T_m$ at its central region, and a temperature $T_r$ at its rear.

During the reading of signal "log.0" (white), during which the magnetization of all layers is directed parallel to the external field, the magnetization state of all three magnetic layers does not change when the domain written with "log.0" enters the range of influence of the external magnetic field He at room temperature and is first heated to $T_f$ and then to $T_m$ by the laser beam in the read-out region. This state constitutes the front mask.

Figure 2:
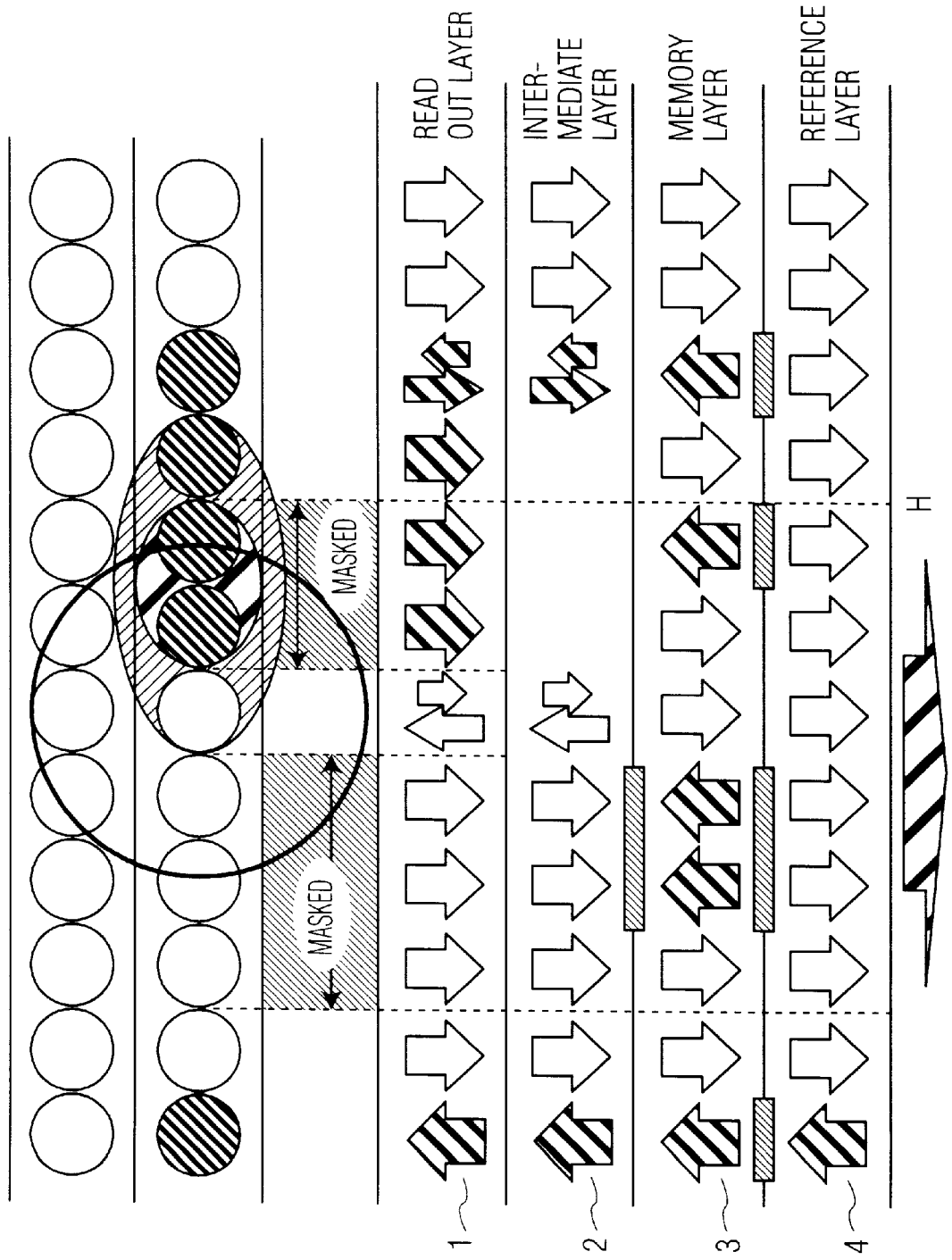
FIG. 2 shows this configuration during the reading-out of a "log.0" signal.

At the temperature $T_m$ the compensation point of the layers 1 and 2 is reached, see FIG. 2. Consequently, the net magnetizations of the layers 1 and 2 initially become zero and their sign changes, during the further heating. Even though the net magnetizations $M_s$ of the layers 2 and 3 are then directed anti-parallel to one another, no horizontal interface wall is formed therebetween, because the magnetizations of the RE and TM components remain directed parallel to one another. As a result, the read-out layer still contains the information "log.0".

In the hot region of the read-out spot the Curie temperature of the layer 2 is exceeded and the resultant net magnetization is zero. It still does not influence the magnetization of its neighbor layers. Because of the absence of coupling with the remainder of the layer system, the layer 1 is then subject only to the effect of the external field; therefore, its magnetization is reversed in the direction thereof so that the rear mask is formed.

When this domain moves out of the hot region of the read-out spot and the temperature drops below the Curie temperature of the layer 2 again, its net magnetization $M_s$ is directed parallel to the external field, because its coercivity is small in the vicinity of its Curie temperature. The magnetization of the RE and TM components of the layer 2 is then directed anti-parallel to that of the layer 3. Despite the parallel oriented net magnetization, a horizontal interface wall has now been formed between the layers 2 and 3. When the compensation point of the layers 1 and 2 is reached, the external field no longer has an effect on the magnetization state. However, because a horizontal interface wall exists between the layer 2 and the layer 3, providing sufficient energy for reversing the magnetization of the layers 1 and 2, the interface wall is annihilated and the magnetization of the two layers is reversed. Thus, below the compensation temperature of the layers 1 and 2 the initial state is reached again in which all layers have an orientation parallel to the external field.

Upon reading out of the signal "log.1" (black, see FIG. 1), during which the magnetization of all layers is directed anti-parallel to the external field, the magnetization direction of the layers 1 and 2 at first becomes parallel to the external field as soon as the domain to be read out enters the range of influence of the external magnetic field He. The layer 3, being the actual memory layer, retains its magnetization anti-parallel to $H_e$ because it has a very high coercivity at room temperature. Consequently, a horizontal interface wall is formed between this layer and the neighboring layer 2. For the layer 3 to retain its magnetization direction it is necessary that its coercive energy $E_{C3}$ is greater than the wall energy $\sigma_{w2,3}$ plus its Zeeman energy in the external field. For $T_a<T<T_m$ it holds that:

$$E_{C3}>2H_eM_{s3}t_3+\sigma_{w2,3}$$

and it also holds that:

$$E_{C1}+E_{C2}+\sigma_{w2,3}<2H_eM_{s1}t_1+2H_eM_{M2s2}t_2$$

In this temperature range $T_a<T<T_m$ the read-out layer and the intermediate layer, being oriented parallel to the external field, mask the information of the memory layer.

In the vicinity of the compensation temperatures of the layers 1 and 2, the coercivity thereof increases towards infinite and the external field cannot influence the orientation of the net magnetization of these layers. However, as is shown in FIG. 1, the magnetization of the layers 1 and 2 can be reversed by exchange coupling with the neighboring memory layer 3, the energy required for this purpose being derived from the interface wall which is then annihilated. Sole magnetization reversal of the layer 2 while maintaining the magnetization direction of the layer 1, in conjunction with the accompanying formation of an interface wall between the layers 1 and 2, would require more energy than simultaneous magnetization reversal of the layers 1 and 2. Therefore, the net magnetizations of the layers 1 and 2 will be directed anti-parallel to the external field. For $T_m \leq T_{cp2}$ it holds that:

$$E_{C1}+E_{C2}<\sigma_{w2,3} \text{ and } E_{C1}<\sigma_{w1,2}$$

At the compensation temperature of the layers 1 and 2 the magnetizations of the RE and TM components of the layers 1, 2 and 3 are thus directed in parallel. The read-out layer, therefore, carries the information "log. 1", in the intermediate temperature range of the read-out spot which extends from the compensation temperature $T_{cp2}$ of the layer 2 to the Curie temperature $T_{C2}$ thereof.

In the hot region of the laser the Curie temperature of the layer 2 is exceeded, without the magnetization state of the layer 1 being changed. The orientation of the RE and TM components remains the same. The magnetization parallel to the external field then forms the rear mask. For the area of the rear mask in the hot region of the read-out spot it holds that:
for $T_m<T<T_r$:

$$E_{C1}+\sigma_{w1,2}<2H_eM_{s1}t_1$$

For $T_{C2}<T<T_r$ it holds that:

$$E_{C1}<2H_eM_{s1}t_1$$

In the further course of the operation the domain leaves the hot region of the read-out spot and is cooled again, the layer 2 then being directed parallel to the external field. When the temperature drops below the compensation point of the layers 1 and 2 during further cooling outside the range of influence of the external magnetic field, the sign of the net magnetizations of the layers 1 and 2 is reversed. Consequently, below the compensation temperature of the layers 1 and 2 once more the initial state is reached in which all layers have an orientation anti-parallel to the external field.

Embodiment 2

A second embodiment of the magneto-optical storage medium according to the invention includes a substrate, four magnetic layers which are arranged one over the other, and one or more further, non-magnetic layers. In addition to the read-out layer, the intermediate layer and the memory layer, this embodiment of the storage medium includes a reference layer 4. This embodiment of a magneto-optical storage medium can be written by means of a LIMDOW method. The writing in conformity with the LIMDOW method enables the writing in one pass in the external field of a drive magnet without reversal of the magnetic field. The temperature profile within the focal spot, produced in a medium by a laser spot, is also utilized during writing. The laser power is adjusted in such a manner that the desired magnetic configurations (corresponding to a write step) occur each time only in the hottest region.

For the write operation in conformity with the LIMDOW method, first the net magnetization of all layers, with the exception of the memory layer, is oriented in the direction of $H_e$ at room temperature, because the coercivity of all layers, except that of the memory layer, is smaller than the magnetic field $H_e$ of the drive magnet at this temperature.
For $T_a$ it holds that:

$$H_{c1}, H_{C2}, H_{C4}<H_e<H_{C3}$$

Figure 4:
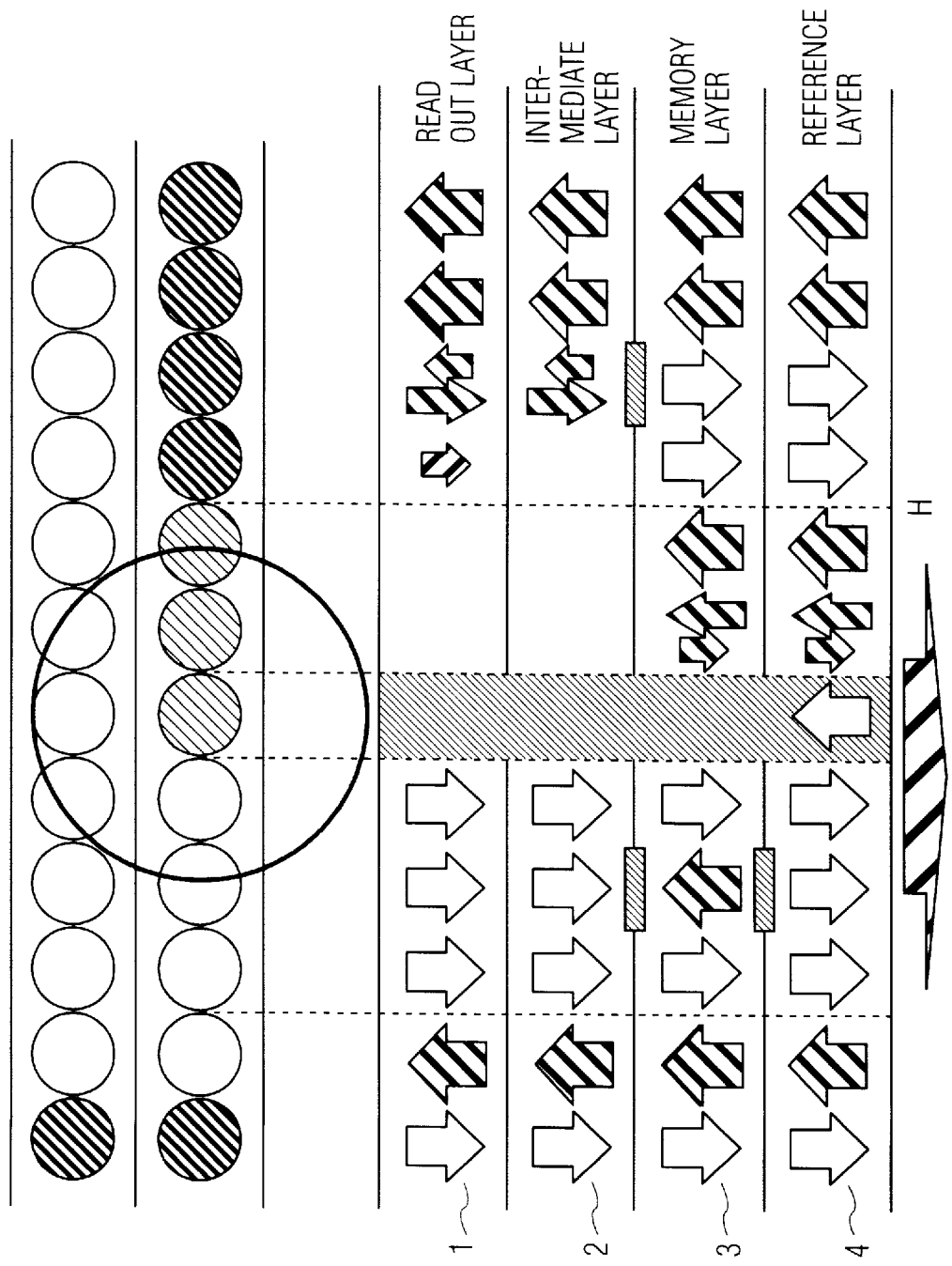
FIG. 4 shows this configuration during the writing of a "log.0" signal.

In order to write "log.0", a weaker laser pulse heats the layers 1 to 3 beyond their Curie point and the layer 4 beyond its compensation point to the temperature $T_l$ (see FIG. 4). The magnetization of the layer 4 is not reversed by the external field.
For $T_l$ it holds that:

$$2H_eM_{s4}t_4<E_4$$

Therefore, heating the layer 4 beyond its compensation point means that the net magnetization of the layer 4 is directed anti-parallel to the external field. Upon cooling first the Curie temperature of the third layer is reached. As a result, the external field He directs the layer 3 in its direction, causing an anti-parallel orientation of the RE and TM components of the layers 3 and 4. This means that a horizontal interface wall, having the wall energy $\sigma w3,4$, is formed between the two layers. It is a prerequisite at this temperature that:
for $T_{C3}$ it holds that:

$$\sigma_{w3,4}<2H_eM_{s3}t_3$$

During the further cooling, the compensation temperatures of the layers 3 and 4 are reached essentially simultaneously, the annihilation of the horizontal wall causing the layer 3 to be directed parallel to the layer 4 which is directed parallel to the external field again below its compensation temperature.
For $T_{cp3}<T_{cp4}$ it holds that:

$$E_{C3}<\sigma_{w3,4}<E_{C4}$$

During the further cooling, the temperature of the layer 1 drops below the Curie temperature. Because its coercivity is small in the vicinity of the Curie point, the net magnetization of the layer 1 will be directed parallel to the external field $H_e$. For $T_{C1}$ it holds that:

$$H_{C1} < H_e$$

When subsequently the temperature of the layer 2 drops below the Curie point, the net magnetization thereof will also be directed parallel to the external field or parallel to the layers 1 and 3.

Because in this temperature range the layers 1 and 2 are magnetically dominated by the TM component but the layers 3 and 4 are magnetically dominated by the RE component, the magnetic moments of the RE and TM components of the layer 2 are directed parallel to those of the adjoining layer 1 and anti-parallel to those of the layer 3. Therefore, a horizontal interface wall containing a corresponding amount of wall energy exists between the layers 2 and 3.

For $T_{C2}$ it holds that:

$$\sigma_{w2,3} < 2H_e M_{s2} t_2 + \sigma \sigma_{w1,2}$$

During further cooling, the temperature of the layers 1 and 2 drops below the compensation points thereof. The exchange coupling with the layer 3 then reverses the magnetization between the layers 1 and 2 while annihilating the horizontal interface wall between the layers 2 and 3.

For $T_{cp1} < T_{cp2}$ it holds that:

$$E_{C1} + E_{C2} < \sigma_{w2,3}$$

During the further cooling to room temperature the magnetization of the layers no longer changes. Therefore the writing by means of a weaker laser pulse thus leads to a magnetization state in which all layers are directed parallel to the external field. This corresponds to "log.0".

Figure 3:
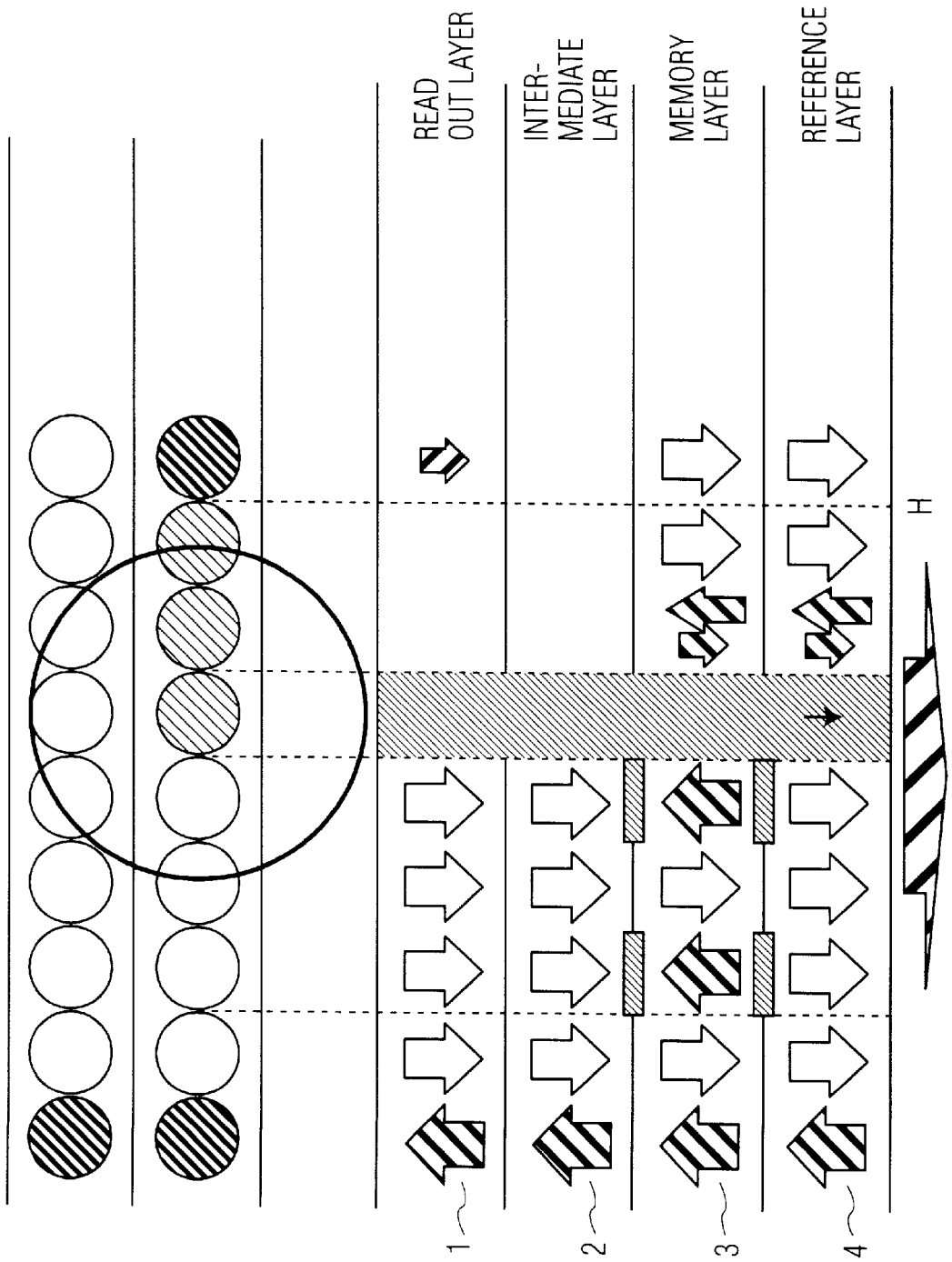
FIG. 3 shows the configuration of a magneto-optical storage medium according to the embodiment 2 during the writing of a "log. 1" signal.

In order to write "log. 1", all layers are heated beyond their Curie point, i.e. to $T_h$, by mean of a strong laser pulse (see FIG. 3). During cooling, first the temperature of the fourth layer drops below its Curie point. The fourth layer then takes over the magnetization direction of the external field.

For temperatures just below $T_{C4}$ it holds that:

$$E_{C4} < 2H_e M_{s4} t_4$$

Subsequently, the temperature of the layer 3 drops below its Curie point and the layer 3 adopts the magnetization direction parallel to the external field. No interface wall is formed between the layer 3 and the layer 4, because the magnetic moments of the RE and TM components are directed in parallel.

In the course of further cooling, the layers 3 and 4 reach their compensation temperatures. The directions of their net magnetization are reversed to the direction anti-parallel to the external field when their temperature drops below the compensation temperatures, the direction of the magnetization of the two components remaining the same. Because the coercivity of the layers is high near the compensation point, the external magnetic field is not capable of reversing the direction of the magnetization of the layers 3 and 4 in that vicinity.

For $T \leq T_{cp3} \leq T_{cp4}$ it holds that:

$$2H_e M_{s3} t_3 < E_{C3} + \sigma_{w3,4}$$

$$2H_e M_{s4} t_4 < E_{C4} + \sigma_{w3,4}$$

$$2H_e M_{s3} t_3 + 2H_e M_{s4} t_4 < E_{C3} + E_{C4}$$

During further cooling, first the Curie point of the layer 1 is reached again and the net magnetization increases in the direction of $H_e$, because the coercivity near the Curie point is small.

For $T_{C1}$ it holds that:

$$H_{C1} < H_e$$

Subsequently, the Curie point of the layer 2 is reached and this layer is directed in the direction of the external field. No horizontal interface wall is formed between this layer and the layer 3, because the magnetizations of the RE and TM components of both layers are directed in parallel.

During further cooling the temperature of the layers 1 and 2 drops below their compensation point and the direction of their net magnetization is reversed, so that now it is directed parallel to the layers 3 and 4 but anti-parallel to the external field.

Because their coercivity goes towards infinite in the vicinity of the compensation point, the external field $H_e$ cannot reverse the direction of the net magnetizations of these layers.

For $T \leq T_{cp2} \leq T_{cp1}$ it holds that:

$$2H_e M_{s1} t_1 < E_{C1} + \sigma_{w1,2}$$

$$2H_e M_{s2} t_2 < E_{C2} + \sigma_{w1,2} + \sigma_{w2,3}$$

$$2H_e M_{s1} t_1 + 2H_e M_{s2} t_2 < E_{C1} + E_2 + \sigma_{w2,3}$$

Finally, all layers are directed anti-parallel to the external field during the writing by means of a strong laser pulse. This corresponds to: "log.1".

The second embodiment of a magneto-optical storage medium according to the invention can also be read-out by means of an MSR method. The read-out operation takes place in the same way as the read-out operation in the first embodiment. The additional reference layer does not influence the read-out operation. Because, like the memory layer 3, it has a compensation temperature and a Curie temperature which lie far beyond the read-out temperatures, its magnetic properties do not change during the read-out operation. Because the reference layer has a low coercivity at room temperature, it is directed parallel to the external magnetic field when it enters this field during the read-out operation.

For the temperature range $T_a < T < T_m$ it holds that:

$$E_{C3} > 2H_e M_{s3} t_3 + \sigma_{w2,3} + \sigma_{w3,4}$$

and $$E_{C1} + E_{C2} + \sigma_{w2,3} + E_{C4} + \sigma_{w3,4} < 2H_e M_{s1} t_1 + 2H_e Ms2 t_2 + 2H_e M_{s4} t_4.$$

What is claimed is:

1. A magneto-optical storage medium for the repeated writing of information at a write temperature $T_w$, or at two write temperatures $T_h$, $T_l$, above room temperature $T_a$ and for the repeated reading out at a temperature $T_m$, with a front mask at the temperature $T_f$ and a rear mask at a temperature $T_r$, above the room temperature $T_a$, in an external magnetic field $H_e$, which medium includes a substrate, a first magnetic layer which is disposed on the substrate and has a temperature-dependent coercivity $H_{C1}(T)$, a compensation temperature $T_{cp1}$ and a Curie temperature $T_{C1}$, a second magnetic layer which is disposed on the first magnetic layer and has a temperature-dependent coercivity $H_{C2}(T)$, a compensation temperature $T_{cp2}$ and a Curie temperature $T_{C2}$, and a third magnetic layer which is disposed on the second magnetic layer and has a temperature-dependent coercivity $H_{C3}(T)$, a compensation temperature $T_{cp3}$ and a Curie temperature $T_{C3}$, where:

$$T_a < T_f < T_m \leq T_{cp1} \leq T_{cp2} < T_{C2} < T_r < T_{C1} < T_{cp3} < T_{C3} \leq T_w$$

and $H_{C1}(T) < H_e$ for $T_a < T < T_m$ $H_{C2}(T) < H_e$ for $T_a < T < T_m$ $H_{C3}(T) > H_e$ for $T < T_w$.

2. A magneto-optical storage medium as claimed in claim 1, characterized in that, it includes a fourth magnetic layer which is disposed on the third magnetic layer and has a temperature-dependent coercivity $H_{C4}(T)$, a compensation temperature $T_{cp4}$ a Curie temperature $C_{c4}$, and the write temperatures $T_l$ and $T_h$, where $$T_a < T_f < T_m \leq T_{cp1} \leq T_{cp2} < T_{C2} < T_r < T_{C1} < T_{cp3} \leq T_{cp4} < T_{C3} < T_l < T_{C4} \leq T_h$$

and $H_{C4}(T) < H_e$ for $T_a < T < T_m$ and for $T \leq T_h$.

* * * * *